Nov. 18, 1969 G. BAUSCH 3,479,564

CONTROL CIRCUIT FOR TURNING OFF STABILIZED STARTING VOLTAGES IN CASE OF SHORT CIRCUIT

Filed Nov. 13, 1967 3 Sheets-Sheet 1

INVENTOR
GÜNTHER BAUSCH

INVENTOR
GÜNTHER BAUSCH

Nov. 18, 1969 G. BAUSCH 3,479,564

CONTROL CIRCUIT FOR TURNING OFF STABILIZED STARTING VOLTAGES IN CASE OF SHORT CIRCUIT

Filed Nov. 13, 1967

3 Sheets-Sheet 3

INVENTOR
GÜNTHER BAUSCH

United States Patent Office 3,479,564
Patented Nov. 18, 1969

3,479,564
CONTROL CIRCUIT FOR TURNING OFF STABILIZED STARTING VOLTAGES IN CASE OF SHORT CIRCUIT

Günther Bausch, Fischbach, Germany, assignor to Diehl, Nuremburg, Germany

Filed Nov. 13, 1967, Ser. No. 682,151
Claims priority, application Germany, Nov. 23, 1966, D 51,613
Int. Cl. H02h 5/00, 3/28, 3/00
U.S. Cl. 317—22 13 Claims

ABSTRACT OF THE DISCLOSURE

A circuit for supplying a plurality of stabilized voltages and operable for interrupting the supply of all thereof when any one of the loads supplied thereby is shorted or otherwise becomes excessive in which a load or series transistor supplies a voltage divider for each stabilized voltage while a regulating transistor controls the bias on the base of each series transistor to maintain the voltage across the respective voltage divider constant. A normally nonconductive transistor is connected to the base of one series transistor and is connected to be sensitive to a voltage drop across any of the voltage dividers of the other series transistors for making said one series transistor nonconductive. The base of the series transistors other than said one are connected to be sensitive to loss of voltage across the voltage divider of said one series transistor for making their respective series transistor nonconductive.

The present invention concerns a circuit for turning off all present stabilized starting voltages of a current supplying device when a strong overload occurs or when the terminals of one of said starting voltages are short circuited, while for producing a stabilized starting voltage there is provided a series transistor, the base of which through a resistor is connected to the voltage at its collector or to a suitable auxiliary voltage, and while a voltage divider is provided which is connected to the emitter of said series transistor at the terminals of which the stabilized stating voltage is withdrawn. The circuit furthermore comprises a second transistor the base of which communicates with a connecting point of the voltage transmitter while the emitter of said second transistor communicates through a reference voltage source with the cold terminal of the voltage divider. The collector of said second transistor is connected to the base of the series transistor. Furthemore, when a plurality of starting voltages is provided, one of said starting voltages represents an independent voltage whereas the other starting voltages are dependent thereon and represent sequential voltages in such a way that the series transistor associated with each of said last mentioned voltages will with its base communicate with the hot terminal of the voltage divider for the independent starting voltage.

Circuits of the above mentioned type have been known a long time. Such an arrangement is disclosed, for instance, in the publication "Technische Informationen für die Industrie, vol. 18 H of Dec. 8, 1958, by Valvo GmbH, Hamburg, and more specifically, page 2, FIGURE 1 of said publication.

Starting from a circuit of the above mentioned type and in particular from the combination of a plurality of such circuits for producing a plurality of starting voltages in a current supplying device, it is an object of the present invention when one of said starting voltages fails, for instance, by short circuit or high overload, to create the possibility immediately to eletcronically turn off all of the starting voltages. This is particularly expedient because when one of the starting voltages of a current supplying device fails frequently those structural elements which additionally are connected to one of the starting voltages may be overloaded or even destroyed. In view of the automatic immediately turning off of all starting voltages in conformity with the present invention the respective structural elements will be protected.

The object outlined above, has been realized by an arrangement according to the present invention which is characterized primarily in that there is provided a control element which with a high overload or a short circuit of the terminals, one of the starting voltages is controlled by a permanent signal produced automatically and thus connects the base of the series transistor of the independent starting voltage with the reference potential common to all starting voltages. The invention is further more characterized by control means which after elimination of the high overload or of the short circuit and a corresponding impulse emission again shifts the control element into its opened control position in which it is held until the starting voltages have again built up.

Accordingly, in conformity with the present invention, with a high overload or short circuit of a starting voltage, all starting voltages are immediately turned off inasmuch as due to the said control element, the series transistor of the independent starting voltage is blocked with the result that also the other starting voltages which are dependent from said last mentioned starting voltage will collapse because the series transistors thereof will likewise be blocked when the independent starting voltage disappears. The said control element will also after elimination of the outer disturbance remain in its respective shifted position until it receives a command from the outside which will cancel the said shifting condition. Only thereafter the starting voltages starting from the independent voltage can again successively build up.

According to a preferred further development of the present invention, the control element is designed as control transistor the emitter of which is connected with the reference potential common to all of the starting voltages whereas the collector of said control transistor is connected to the base of the series transistor of the independent starting voltage. This control transistor, thus when in conductive condition, the base current withdraws from the series transistor of the independent starting voltage and thereby brings about the blocking of the series transistor.

It is the object of the control means within a short time to place the said control transistor into blocked condition in response to a corresponding order from the outside. The said control transistor is also, after turning off the starting voltages, held continuously in conductive condition by the non-controlled idling direct voltage. Furthermore, the control transistor is held into the said condition until the starting voltages are able to build up in view of the series transistor of the independent starting voltage which is now again continuously controlled. When this build up has been completed, the control transistor is by the starting voltages automatically held in its blocking conditions.

To this end, the control means according to a further development of the invention, comprise a transistor the output of which is connected with the control input of the control element. Furthermore, these control means also comprise a blind resistor connected to the base of said transistor, which blind resistor is by means of its terminal, and as the case may be via a diode connected with the reference potential. The said transistor makes possible a short term conductiveness of the transistor in response to a corresponding current impulse. The time delay produced by the blind resistor is so dimensioned that the control transistor will remain conductive for the period for which the control transistor following said first mentioned transistor has to be kept in its blocked position. This time constant therefore must be sufficient to permit the starting voltages to build up, but it must not be too high so as to safeguard the circuit immediately after the build up of the starting voltages against possible high overload or short circuits.

The blind resistor is expediently formed by a condenser and if desired by an additional ohm resistance. According to the present invention, however, it is also possible to employ a coil arranged in parallel to the base emitter path of the transistor. The order for again turning on the starting voltages after elimination of an outer disturbance is in conformity with the present invention produced by a key within a control circuit of the transistor, which key in non-actuated condition connects the blind resistor by its second terminal with the reference potential, and which key in its working condition connects the blind resistor by the second terminal with a potential which does not change when turning off the starting voltages.

As mentioned above, the control transistor will after the re-build up of the starting voltages be automatically held in its blocked condition. This is effected in conformity with a further development of the invention by connecting the control inlet of the control element to a voltage divider one end of which is connected to the hot clamp of a starting voltage while the other end of said voltage divider is located on a potential which does not change when turning off the starting voltages.

The invention is illustrated by way of example in the accompanying drawings, in which.

Figure 1:
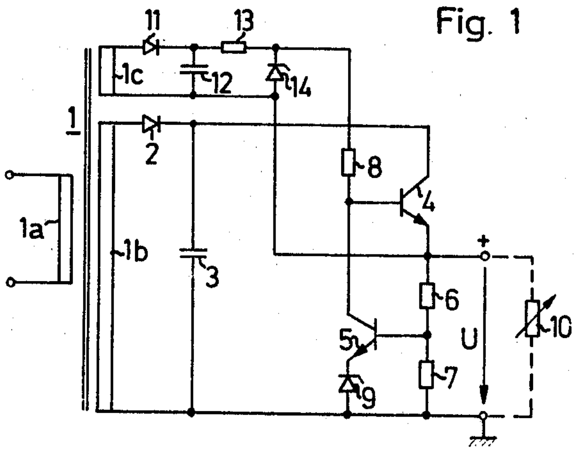
FIG. 1 shows a prior art control arrangement in which for purposes of improving the control, there is additionally provided an auxiliary voltage likewise known per se.

Referring now to the drawings in detail, FIG. 1 illustrates a prior art circuit for stabilizing a starting voltage. A transformer 1 is provided with the primary winding 1*a* and secondary windings 1*b* and 1*c*. For rectifying the alternating voltage at the secondary winding 1*b* there are provide a diode 2 and a smooth condenser 3. A series transistor 4 and a control transistor 5 serve for stabilizing the pulsating direct current voltage at the terminals of the condenser. The stablized starting voltage U is withdrawn from a voltage divider comprising the resistors 6 and 7. As base resistor for the series transistor 4 serves a resistor 8 while a Zener diode 9 produces a comparison voltage for the transistor 5. Each load serves a vadiable resistor 10. This circuit is fully effective for stabilizing a non-controlled direct current voltage. However, by the employment of an additional auxiliary voltage, the controlling effect of said circuit can be improved and makes possible to furnish a still better stablized starting voltage U. For purposes of producing this auxiliary voltage, there are provided the second secondary winding 1*c* of the transformer, a diode 11, a condenser 12, a resistor 13, and a Zener diode 14. These elements produce a constant voltage at the two terminals of said Zener diode 14. This constant voltage is conveyed to the base and to the emitter of the series transistor 4.

This circuit operates as follows: when the starting voltage U changes in the direction of positive values, either by changing the load or by changing the voltage at the terminals of the secondary winding 1*b*, also the voltage at the resistor 7 of the voltage divider increases thereby producing an increased conductivity of the transistor 5. As a result thereof, the base current for the series transistor 4 flows to an increased extent through the transistor 5 whereby the series transistor 4 has its conductivity reduced. This brings about an increase in the collector-emitter resistance of this transistor and thereby a reduction in the current through said transistor. This reduced current will at the voltage divider 6, 7 produce a voltage drop and will thereby act counter to the original voltage changes in the direction of a stabilization of the starting voltage.

Figure 2:
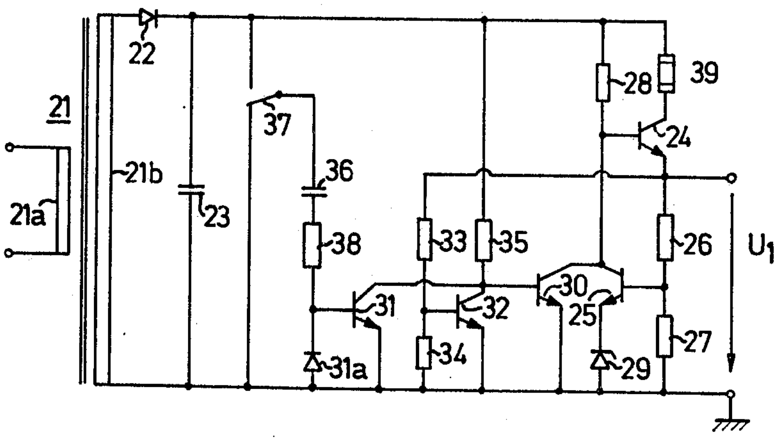
FIG. 2 shows a circuit according to the invention for turning off a starting voltage.

FIG. 2 illustrates the circuit in an arrangement according to FIG. 1 for producing a single stabilized starting voltage. With this embodiment, however, the auxiliary voltage is omitted. In this connection it may be in order that with this embodiment of the invention it is merely intended to explain the fundamental operation while the employment of the invention in practice is primarily directed to the turning off of circuits with a plurality of starting voltages. With the last mentioned field of employment, the invention furnishes particular advantages inasmuch as the means for turning off one starting voltage is practically as high as the means for turning off two or three of such starting voltages.

The reference numerals 21–29 in FIG. 2 designate the same elements as described in FIG. 1. As control element for blocking the transistor 24 there is provided a control transistor 30. For controlling said transistor 30 for again turning on the starting voltage there is provided a transistor 31. The transistor 32 serves as inverter and is merely intended to produce a signal with the proper polarity for the control transistor 30. The resistors 33 and 34 form a voltage divider and give off a signal to the base of the inverter 32, which signal is dependent as to size on the starting voltage. The resistor 35 together with the collector-emitter path of the inverter 32 likewise forms a voltage divider and serves for controlling the control transistor 30. The controlling of the transistor 31 is effected through a condenser 36 and a key 37 which in its rest position short circuits the condenser 36. For purposes of protecting the condenser 36 and the transistor 31 there is provided a small protective resistor 38. When actuated, the key 37 connects the condenser 36 to the positive pole of the non-controlled direct current voltage and thereby brings about that a positive impulse will reach the base of the transistor 31 until the condenser 36 has been charged completely. The diode 31*a* is intended to prevent an unduly negative voltage from being placed onto the base of the transistor 31.

The circuit according to the present invention serves for turning off the starting voltage U1 when a high overload occurs at the output terminals, or a short circuit occurs. The circuit according to the invention, however, cannot check an overload of the current supply device which may last over a longer period of time, but is still far away from a short circuit. Therefore, meltable fuse 39 is provided which will respond when the current supply device is subjected to an overload of a longer period of time.

It may be assumed that the transistors 24 and 25 are conductive and that at the terminals of the voltage divider 26 and 27 there exists a starting voltage U1. The transistors 30, 31 are blocked, the transistor 32 is conductive, the key 37 occupies its rest position, and the condenser 36 is thus discharged. If now, in view of a high overload or a short circuit, the starting voltage U1 collapses, also the voltage at the voltage divider 33, 34 decreases to the same extent with the result that the transistor 32 is increasingly blocked. This means that the collector potential of this transistor increases and brings about a conductivity of the control transistor 30. Transistor 30 will thus be controlled into the conductive condition to such an extent that it will have a lower collector-emitter resistance than the transistor 25 and will thus withdraw the base current from the series transistor 24 to an increasing extent. The transistor 24 is completely blocked and will thus bring about a turning off of the consumer at the terminals of the output voltage U1 from the current supply device. At the terminals of the condenser 23, the idling direct voltage remains and brings about that through the resistor 35, continuously a positive potential will remain at the base of the transistor 30 which latter will thus be maintained in conductive condition. If the short circuit or the high overload is now eliminated, the key 37 will temporarily be brought into its working position and will make possible a charging of the condenser 36. Until this condenser has been charged, however, a positive potential will prevail at the base of the transistor 31 which potential will control said transistor in a conductive manner and will bring about that a blocking signal is conveyed to the base of the control transistor 30. As soon as transistor 30 is blocked, a base current again flows into the series transistor 24 whereby the latter is controlled conductively. The output voltage at the terminals of the voltage divider 26 and 27 can build up again. With the increase in the output voltage U1 to its full positive value also the potential at the voltage divider 33, 34 will increase and thus also at the base of the inverter 32. The inverter 32 will again be conductively controlled and will now place a blocking potential onto the base of the transistor 30. With the ever increasing charge of the condenser 36, the potential at the base of the transistor 31 will decrease with the result that eventually the said transistor will be completely blocked. The output signal of this transistor which would place the control resistor again into conductive condition can, however, not become effective at the base of this transistor because transistor 30 is by means of the inverter 32 kept on a blocking potential. If now, the key 37 is brought again into its rest position, the condenser 36 discharges into control arrangement will again occupy its original starting position.

As has been mentioned above, the dimensioning of the control circuit for the transistor 31 has to be so selected that the charging of the condenser 36 on one hand, takes place so slowly that the transistor 31 will be retainer in conductive condition until the output voltage U1 can again build up. While on the other hand the charging must be completed before, due to an immediate new disturbance at the terminals of the output voltage, the transistor 30 must again be controlled into conductive condition.

Figure 3:
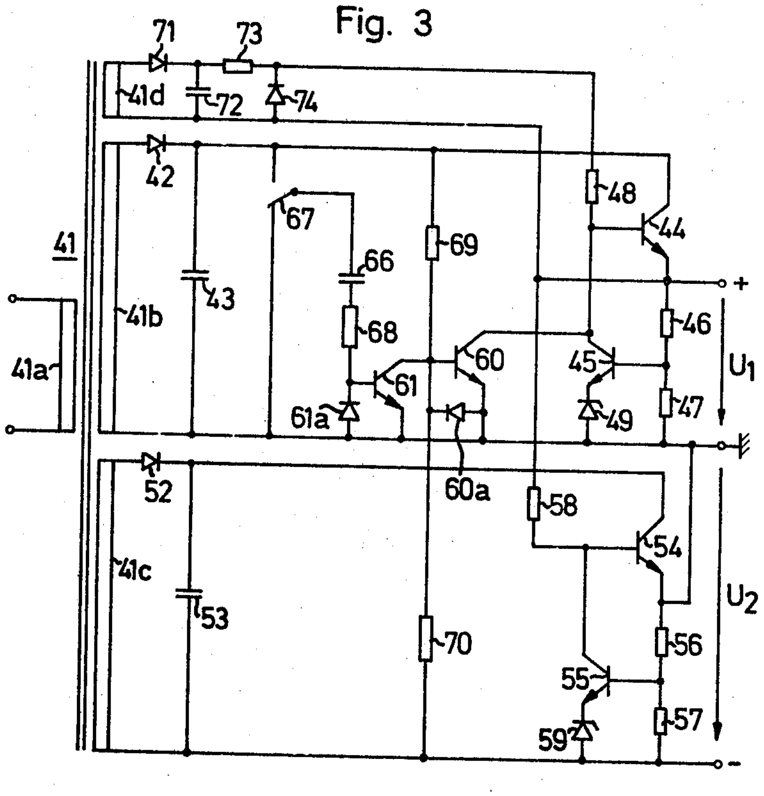
FIG. 3 shows a circuit according to the invention for turning off two starting voltages.

The circuit according to FIG. 3 produces two stabilized output voltages, namely a positive and a negative voltage. The positive starting output voltage is brought about by the elements referred to in connection with FIG. 2 and designated with the reference numerals 41–49. For producing the negative output voltage there are provided in an analogous manner the elements 41 and 52–59. The structural elements according to the invention are designated with the reference numerals 69–70 while in contradistinction to the embodiment of FIG. 2 an inverter transistor and a collector resistor for said inverter transistor are no longer required. The reason for this consists in that the voltage divider 69, 70 is interposed between a positive and negative potential in contrast to the embodiment of FIG. 2, according to which the voltage divider 32, 35 is located only between a posititve and a zero potential. Consequently, at the tapping point of the voltage divider 69, 70 there will prevail a potential of the correct polarity for conductivity controlling the transistor 60 when the output voltage collapses.

According to the illustrated embodiment, again an auxiliary voltage is provided which is produced in the above described manner by the elements **41*d* and 71 to 74**.

The output voltage U1 is to be considered the independent voltage and the output voltage U2 is consequently to represent the sequential voltage. In conformity with the present invention, therefore, the control transistor 60 must always be located in the control circuit of the series transistor 44 of the independent output voltage. The auxiliary voltage is placed onto the base and the emitter of this series transistor of the independent output voltage. The ratio of dependence of voltage U2 from voltage U1 is obtained from the fact that the base of the transistor 54 for the output voltage U2 is through a resistor 58 located at the emitter of the series transistor 44 of the output voltage U1. When the output voltage U1 disappears, therefore, due to the blocked series transistor 54, also the output voltage U1 automatically collapses. The stabilizing operation for the output voltage as described above in connection with FIG. 1 is with the output voltage U2 following in an analogous manner to the stabilizing operation of the output voltage U1.

The operation of the arrangement is as follows: it may be assumed that the transistors 44, 45 and 54 and 55 are conductive, which means that also the output voltage U1 and U2 prevail. The transistors 60 and 61 are consequently blocked and the condenser 66 is discharged by means of the key 67 occupying its rest position. If now, for instance, the output voltage U2 collapses in view of a high overload or in view of a short circuit, the potential of the lower terminal of resistor 70 moves from a negative value to the value zero. This, however, means that the potential increases at the base of the control resistor 60 whereby the latter becomes conductive and withdraws base current from the series transistor 44 in the manner described above. Now the series transistor is blocked and consequently the output voltage U1 collapses. Thus, the potential at the emitter of the series transistor 44 moves from a positive value to the value zero, and the potential at the base of the series transistor 54 will accordingly become more negative. As a result thereof, transistor 54 will likewise be blocked, and the output voltage U2 will disappear. The current supply device is turned off at its output.

When the outer disturbance has been remedied, key 67 is temporarily brought into its working position and thus through the condenser 66 a positive potential is placed onto the base of the transistor 61. Transistor 61 becomes conductive and places a blocking potential onto the base of transistor 60. As soon as transistor 60 is blocked, the series transistor 44 again receives base current, and the output voltage U1 can again build up. Simultaneously, with the increase in the positive potential at the resistor 46, also the potential at the base of the series transistor 54 becomes more positive, whereby transistor 54 is again controlled into the conductive condition and thus a rebuild-up of the output voltage U2 is made possible. During this time, the condenser 66 was charged more and more, and the transistor 61 is now blocked again. Its output signal, however, can no longer become effective at the base of the transistor 60 because in the meantime the resistor 70 is again at a negative potential, and at the base of the transistor 60, a blocking potential is produced.

If, however, the output voltage U1 would collapse in view of an outer load, as a result thereof the series transistor 54 would be blocked and the output voltage U2 would collapse. As a result thereof, the potential at the base of the control transistor 60 would move accordingly in the direction of positive values and would control said transistor in a conductive manner whereby the transistor 60 will, in the already known manner withdraw the base current from the series transistor 44 and thereby would block the same. The arrangement, therefore, is such that for purposes of conductively controlling the control transistor 60, first the output voltage U2 must disappear regardless of whether a too high load occurred or did not occur at the terminals of the output voltage U1 or at the terminals of the output voltage U2.

Figure 4:
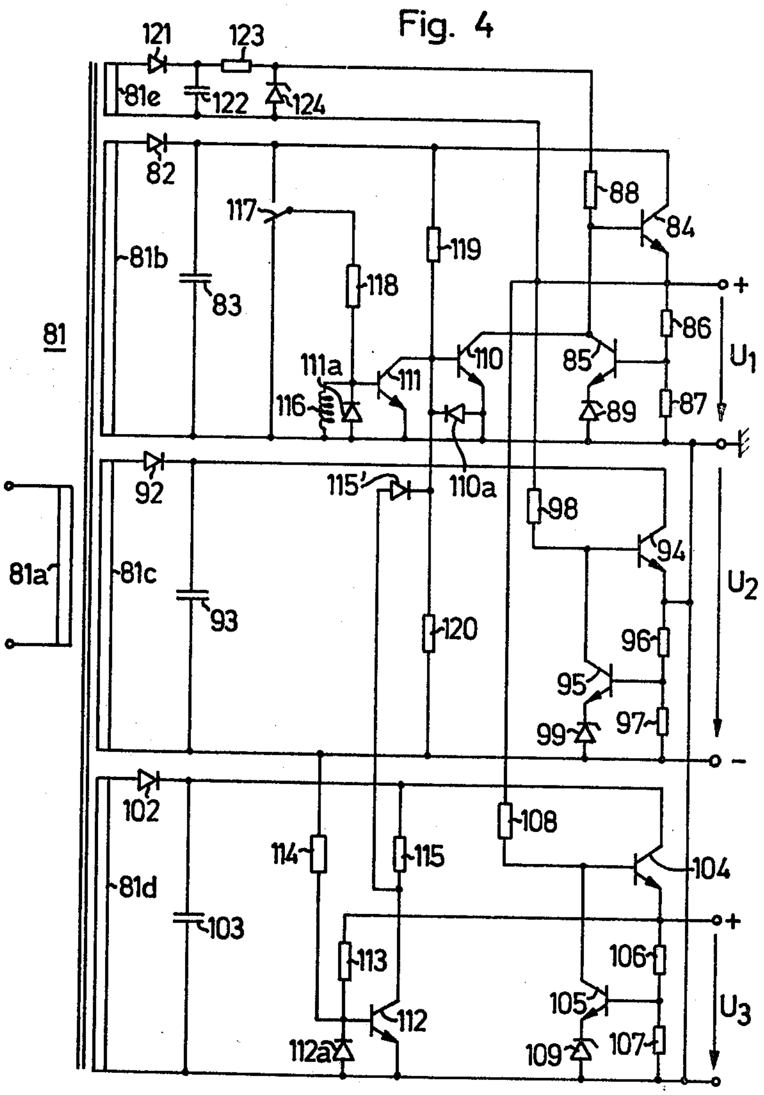
FIG. 4 shows a circuit according to the invention for turning off three starting voltages.

FIG. 4 shows a further embodiment of the invention according to which a total of three output voltages are checked in the manner according to the present invention. The structural elements for producing the stabilized output voltage U1 are designated with the references **81*b* and 82–89**, whereas the structural elements for producing the negative output voltages U2 are designated with the reference numerals 81*c* and 92–99. The structural elements for producing the positive voltage U3 are designated with the reference numerals 81*d* and 102–109. The structural elements for realizing the circuit according to the invention are designated with the reference numerals 110–120, whereas the structural elements for producing the auxiliary voltage also provided in this instance, are designated with the reference numerals 81*e* and 121–124. The output voltages U2 and U3 are voltages as a result of the independent output voltage U1. This is realized by the fact that the series transistors 94 and 104 of the two output voltages U2 and U3 are through the resistors 98 and 108 connected to the emitter of the series transistor 84 of the output voltage U1.

The control arrangement according to the invention represents a combination of the arrangement of FIGS. 2 and 3. For purposes of facilitating the structural elements of the same effect, all structural elements in all three figures which correspond to each other have been designated with the same decimal debit. Thus, for instance, the control transistor 110 and the transistor 111 are arranged in the same manner as the transistors 60 and 61 in FIG. 3 and the transistors 30 and 31 in FIG. 2. For purposes of checking the positive starting voltage U3, additionally structural elements have to be used if they were specifically necessary for checking the positive output voltage U1 in FIG. 2. In this connection, particularly the inverter 112 is to be mentioned which through a diode 115′ is connected to the connecting point between the collector of the transistor 111 and the base of the control transistor 110. This inverter is intended for the same purpose as the inverter 32 in FIG. 2, namely to produce a potential which is suitable for conductively controlling the control transistor 110. As blind resistor in this embodiment, a coil 116 has been selected instead of a condenser. In order to be able by means of said coil 116 to realize the same effect as with a condenser, the said coil instead of being arranged in series to the base of the control transistor 111 had to be arranged in parallel to the base-emitter path of said transistor 111.

The operation of this circuit will be obvious in view of the detailed description of the operation of the other embodiments. When the voltage U1 collapses, in view of the fact that the voltages U2 and U3 are voltages resulting from the voltage U1, first these voltages are turned off by blocking the series transistors 94 and 104 while simultaneously the potential on the resistor 120 moves in the direction toward zero and thereby the transistor 110 becomes conductive. Additionally, the positive potential on the resistor 113 moves toward lower values and thereby brings about a blocking of the inverter-transistor 112. This in turn through the diode 115′ brings about that the potential at the base of the control transistor 110 becomes positive. If, however, either the starting voltage U2 or the voltage U3 collapses, in the manner described above, first the control transistor 110 is conductively controlled and thereby the base current is withdrawn from the series transistor 84 of the output voltage U1 so that series transistor 84 will be blocked. This brings about a collapse of the output voltage U1, as a result of which, through the resistors 98 and 108 the series transistors 94 and 104 are blocked whereby the output voltages U2 and U3 disappear.

From the above, the following general rule can be derived for the necessity of employing an inverter. In the following, only transistors of the small npn-conductively type are referred to. To transistors of the pnp-type analogous remarks apply while, however, instead of positive voltages, negative voltages must be employed, and vice versa. If only positive output voltages are to be checked, each output voltage must have an inverter associated therewith which has to be arranged in conformity with the inverters 32 and 112. This is due to the fact that when checking positive voltages at the collapse of which a negative potential is formed which is not suitable for conductively controlling an npn-transistor and therefore requires the interposition of an inverter. If positive and negative output voltages are to be checked according to the present invention, no inverter is required for all negative output voltages, whereas for all positive output voltages with the exception of the first positive voltage which expediently is selected as an independent voltage, one inverter each is required which has to be arranged in the manner shown in FIG. 4 (inverter 112).

Finally, it is to be noted that the key 37, or 67, or 117 is not necessary under all circumstances. For instance, the employment of such key can be avoided by placing the condensers 36, 66 or coil 117 on the positive pole of the idling direct current voltage or the auxiliary voltage, and by temporarily pulling the network plug of the current supply device prior to again turning on the output voltage after an outer disturbance due to high overload or short circuit. When again turning on the network, a positive output signal as it occurs when actuating the key will be formed on the blind resistor 36, 66, 116.

Thus, while in the preceding description reference was made always to *one* series transistor necessary for the stabilization of an output voltage, it is, of course, also possible to provide a cascade of additional transistors preceding the base of said series transistors. The control of said cascade may then be effected at the base of the first transistor.

What is claimed is:

1. A circuit for supplying a plurality of stabilized direct current voltages and operable for interrupting the supply of all of said voltages in response to an overload or short circuit in the load supply by any one thereof comprising; an unregulated supply for each said voltage, a series transistor having its collector-emitter path connected across each unregulated supply and a voltage divider in series with each series transistor and across the terminals of which the prespective stabilized voltage is established by current flow through the pertaining series transistor, a source of bias voltage connected to the base of one of said series transistors via a resistor, the end of the voltage divider of said one series transistor remote from the respective series transistor forming a reference point and being connected to one end of each voltage divider pertaining to the other series transistors, the bases of the others of said series transistors being connected via resistors with the end of the voltage divider of said one series transistor opposite said reference points, a regulating transistor for each series transistor having its collector-emitter path connected between the base of the respective series transistor and the end of the respective voltage divider which is remote from the respective series transistor and having its base connected to an intermediate point along the respective voltage divider, and normally open control relay means connected between the base of said one series transistor and said reference point and operable response to an overload or short circuit on the terminals of any of said voltage divider to close and thereby reduce the bias on the base of said one series transistor to the point of said series transistor becomes nonconductive thereby reducing the bias on the bases of the other series transistors so that they also become nonconductive, and means selectively operable for resetting said relay to open condition for reestablishing said stabilized voltages.

2. A circuit according to claim 1 in which said control relay means is a control transistor.

3. A circuit according to claim 2 in which said control transistor has its collector-emitter path connected between the base of said one series transistor and said reference point and its base connected to the voltage divider of the other series transistor in such a manner as to be biased to nonconduction thereby when both of said other series transistors are conductive.

4. A circuit according to claim 3 in which said means for resetting said control relay means to open condition comprises an auxiliary transistor having its collector-emitter path connected between the base of said control transistor and said reference point and a switch blade connected to the base of said auxiliary transistor having a normal first position wherein the blade is connected to the emitter of the auxiliary transistor so the auxiliary transistor is nonconductive, said blade having a second position with which it is selectively moveable wherein it is connected to a source of potential which will bias said auxiliary transistor to conduction.

5. A circuit according to claim 4 in which includes a condenser between said switch blade and the base of said auxiliary transistor.

6. A circuit according to claim 5 in which a diode poled toward the base of said auxiliary transistor is connected between said reference point and the base of said auxiliary transistor.

7. A circuit according to claim 6 in which a resistor is in series with said condenser between said switch blade and the base of said auxiliary transistor.

8. A circuit according to claim 6 in which a coil is connected in parallel with said diode.

9. A circuit according to claim 2 in which said control transistor has its collector-emitter path connected between the base of said one series transistor and said reference point, a further voltage divider having one end connected to a constant voltage source of potential and its other end connected to the end of one of the said voltage dividers pertaining to said series transistor, and the base of said control transistor being connected to a point along said further voltage divider which will bias the control transistor to nonconduction when the voltage across said one voltage divider is normal while biasing the control transistor to conduction when the voltage across said one voltage divider fails.

10. A circuit according to claim 9 in which an inverter is connected between said point along said further voltage divider and the base of said control transistor.

11. A circuit according to claim 10 in which said inverter is a further transistor having its emitter connected to said reference point and having its collector connected to the base of said control transistor and having its base connected to the end of the voltage divider of the pertaining series transistor which is opposite said reference point.

12. A circuit according to claim 1 which includes a fuse in series with each series transistor.

13. A circuit according to claim 1 in which said relay means is a control transistor having its collector-emitter path connected between the base of said one series transistor and said reference point, means connected to the base of said control transistor and normally biasing the control transistor to nonconduction, and means sensitive to the loss of voltage across any of said voltage dividers for changing the bias on the base of said control transistor so as to make it conductive.

References Cited

UNITED STATES PATENTS 3,229,164 1/1966 McCartney et al. ---- 317—22
3,345,554 10/1967 Lupoli ----------- 317—33 X JOHN F. COUCH, Primary Examiner J. D. TRAMMELL, Assistant Examiner U.S. Cl. X.R.

307—39, 87; 317—31, 33, 46; 323—22